C. W. BALL & T. DAVIS.

VEHICLE WHEEL.

No. 9,995. Reissued Jan. 3, 1882.

Witnesses:
F. M. Burnham
George Connell

Inventors:
Charles W. Ball
and Thomas Davis.
by J. S. Zerbe, their Atty
per L. Deane. Asst.

N. PETERS, Photo-Lithographer, Washington, D. C.

UNITED STATES PATENT OFFICE.

CHARLES W. BALL AND THOMAS DAVIS, OF MACON, ILLINOIS.

VEHICLE-WHEEL.

SPECIFICATION forming part of Reissued Letters Patent No. 9,995, dated January 3, 1882.

Original No. 241,276, dated May 10, 1881. Application for reissue filed July 7, 1881.

DIVISION B.

*To all whom it may concern:*

Be it known that we, CHARLES W. BALL and THOMAS DAVIS, of Macon, in the county of Macon and State of Illinois, have invented certain new and useful Improvements in Vehicle-Wheels; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
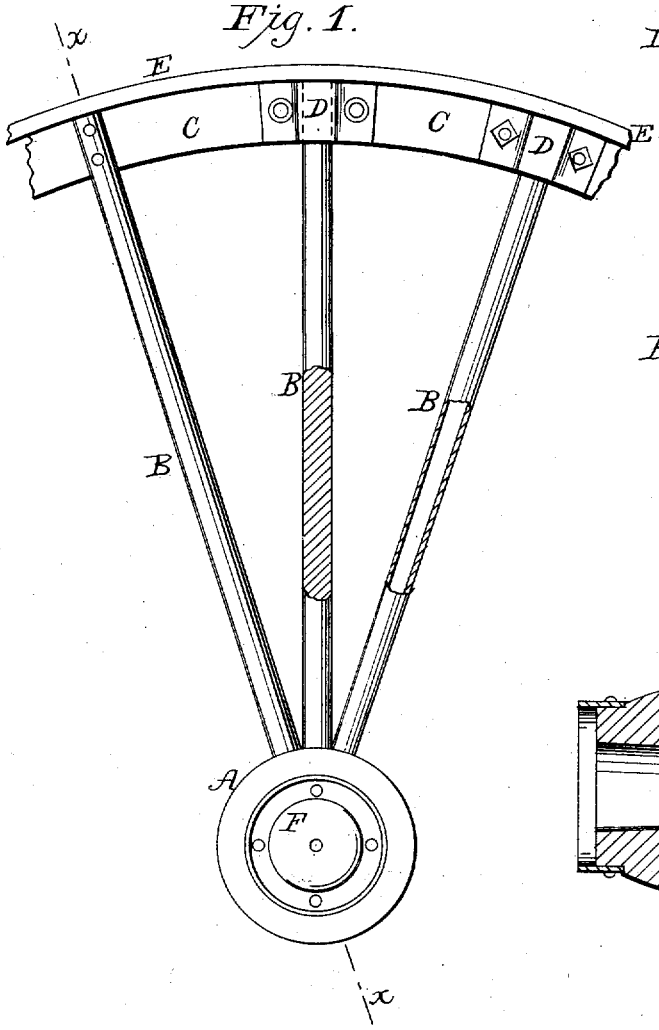
Figure 2:
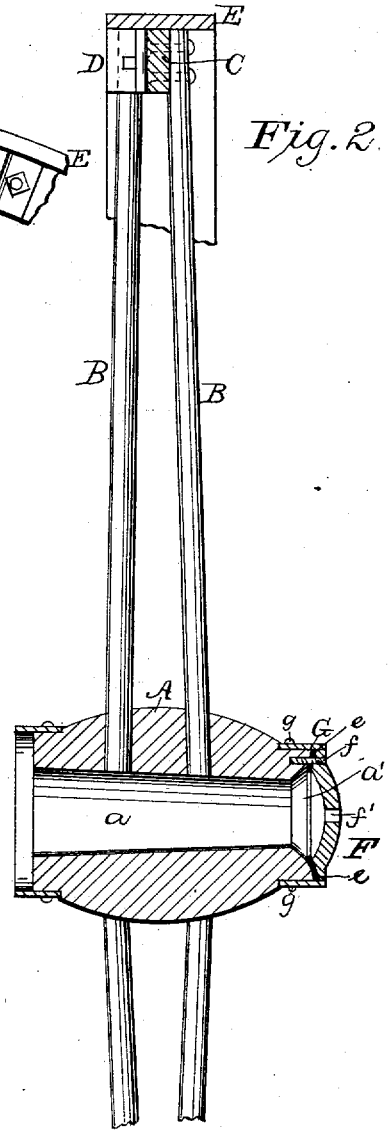
Figure 3:
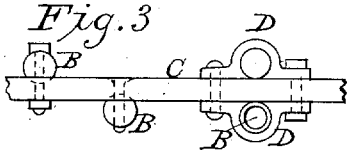

Figure 1 is a side elevation of a part of one of our improved wheels. Fig. 2 is a sectional elevation taken through line *x x*, Fig. 1. Fig. 3 is a plan view of a part of the wheel.

This division of the patent relates to that class of devices known as "axle-lubricators;" and the novelty consists in the peculiar construction and combination of the parts forming the outer or front end of the hub, whereby a simple, cheap, and easily-adapted structure is made that will afford a very efficient and very durable device for lubricating the axles of vehicles or like articles, all as will now be more fully set out and explained.

In the accompanying drawings, A denotes any usual or ordinary carriage-hub, in which the spokes B are set or fixed in any desired way. *a* is the central opening, by which the hub is fitted on the axle. The tire is shown at E and the felly at C. On the felly are sockets or supporting or strengthening pieces D, fixed alternately on the sides of the felly. These features in their present construction and arrangement constitute the subject of the other division of this patent, and no claim is therefore laid to them herein.

The outer end of the hub, as at *a'*, may be hollowed out a little, and to and upon this end is snugly fitted the cap F, preferably of metal and generally at the end concavo-convex in shape, as seen in Fig. 2. This cap is so applied that the space *a'* formed between the inside of said cap and the end of the hub will make a chamber of some considerable size.

The cap F may be secured in place in any desired way, as by screws *f* passing through its edge and into the end of the hub F, and the mud-ring G, which is secured in any desired way to the hub, has its edges *g* overlapping the edge of cap F, which will be held as now seen in Fig. 2.

When this device as thus made is used, oil or other suitable lubricant can be poured through the central opening, *f'*, into the space or chamber *a'*, whence it will very readily and very effectually find its way in proper quantity to the wearing parts of the hub.

An annular washer, *e*, is inserted between the inner face of the cap F and the end of the hub, which serves the triple purpose of acting as a cushion for said cap, forming a tight joint between said hub and cap, and thereby absolutely preventing the exuding of the lubricating material at that point, and also by preventing the entrance at the joint of any air, thus insuring the retention within the lubricant-receptacle of the lubricant and preventing its outflow through the perforation *f'*, which it would be apt to do were there no washer at the joint, as in such case air would be apt to enter therein and to some extent force the lubricant out through the perforation *f'*. The parts will always hold their place and thus insure the existence of the reservoir-space.

This method of closing or facing the end or front of the hub will also be of advantage in covering thoroughly the end of the hub and in keeping out all dirt.

The device can be very easily and cheaply made, and can in a very ready manner be applied to any class of carriages, even those having the common wooden wheel as well as to those having metal hubs.

The mud-band G and oil-cap F take the place of the ordinary point-band, but possessing advantages not found in such latter device. The band G is secured as is usual to the reduced outer end of the hub, and within this band the cap is placed. The cap F is secured to the end of the hub independently of the band, and at the same time is snugly set against the latter. In this way the band effectively protects the cap, for if the end of the hub be struck the band will take the blow and if forced off will not disturb the cap. The latter making a close joint with the band, all grit, &c., are kept out. This device forms a neat, tasty, and durable lubricator. The cap holds the lubricant to the hub and is in no danger of being forced off.

Having thus described our invention, what we consider new, and desire to secure by Letters Patent, is—

The hub A, having the mud-band G secured upon its outer end, in combination with the oil-cap F, secured to the end of said hub within but independently of said band, and forming a tight joint with the latter, and having the lubricating-hole *f'*, all constructed and arranged as and for the purpose set forth.

In testimony whereof we affix our signatures in presence of two witnesses.

CHARLES W. BALL.
THOMAS DAVIS.

In presence of—
C. H. FAILING,
D. W. MCINTYRE.